United States Patent [19]
Shirodker

[11] 3,859,134
[45] Jan. 7, 1975

[54] UNFORMED ELECTRODE PLATES FOR LEAD STORAGE BATTERIES

[75] Inventor: Rogunata Shirodker, Misburg, Germany

[73] Assignee: Varta Batterie Aktiengesellschaft, Hannover, Germany

[22] Filed: June 21, 1973

[21] Appl. No.: 372,133

[30] Foreign Application Priority Data
June 28, 1972 Germany.............................. 2231639

[52] U.S. Cl.......................... 136/26, 136/27, 136/64
[51] Int. Cl. .......................................... H01m 35/00
[58] Field of Search............. 136/19, 64, 36, 26–27, 136/134–135, 176, 175, 34–35, 75–76

[56] References Cited
UNITED STATES PATENTS
1,364,011  12/1920  Smith................................... 136/64
2,845,469  7/1958  Tiegel.................................. 136/19
3,072,984  1/1963  Bronstert..................... 136/134 R X
3,080,445  3/1963  Brown................................. 136/111
3,238,579  3/1966  Sabatino et al................. 136/176 X
3,764,386  10/1973  Mix..................................... 136/26

FOREIGN PATENTS OR APPLICATIONS
1,890  11/1901  Great Britain....................... 136/19

*Primary Examiner*—Anthony Skapars
*Attorney, Agent, or Firm*—Gerard J. Weiser; Alfred Stapler; Karl L. Spivak

[57] ABSTRACT

In the process of "forming" storage battery electrode plates, the plate lugs are at least partly coated, prior to forming, with a thermoplastic, acid resistant, adherent material. The coating prevents the oxidation of lugs during the process of formation, thus eliminating the need of cleaning and flux treatment during the assembly of plates into elements.

21 Claims, 2 Drawing Figures

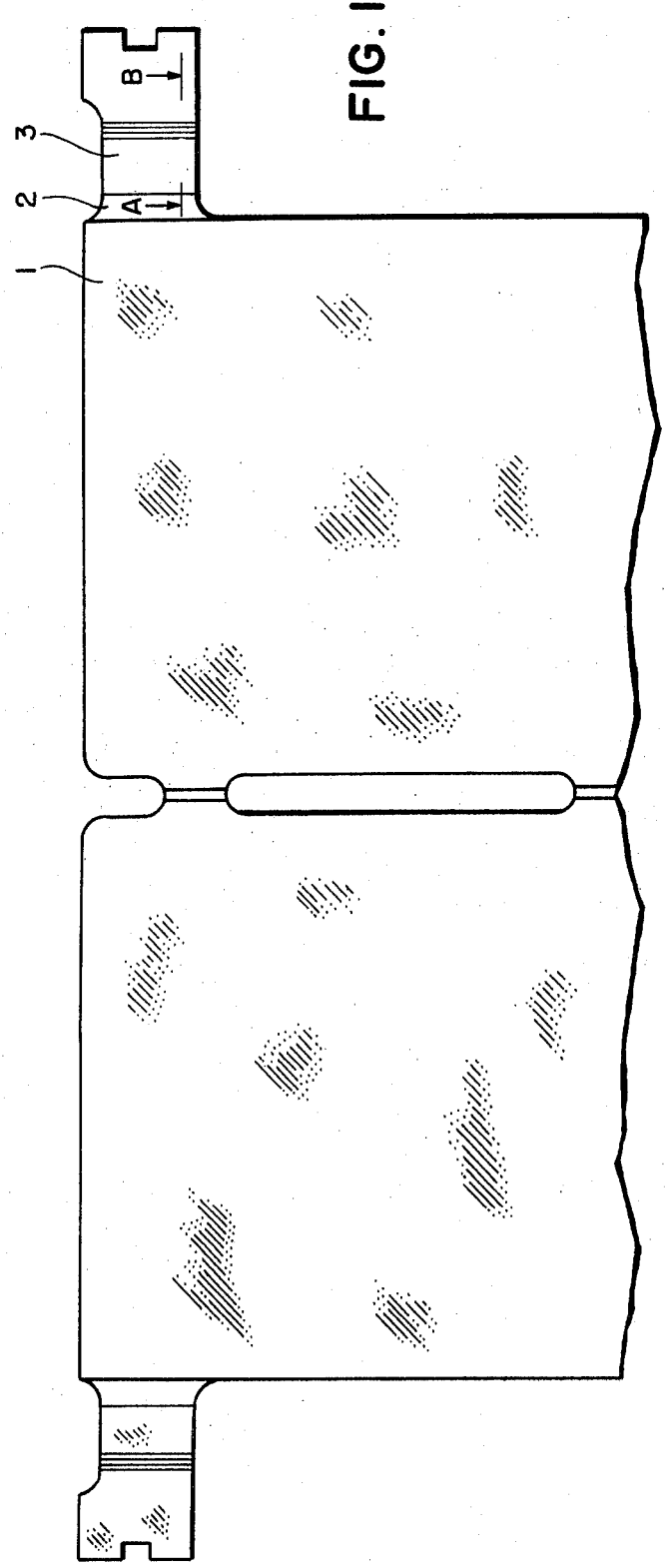

UNFORMED ELECTRODE PLATES FOR LEAD STORAGE BATTERIES

BACKGROUND OF THE INVENTION

The invention relates to unformed electrode plates for lead storage batteries. In the production of formed electrode plates for lead storage batteries, the plates, after being pasted and cured, are "formed" in a forming vat. This involves charging and discharging the plates while in dilute sulfuric acid. During this electrolytic forming process, not only the active material, but also the exposed lead parts of the electrode plates are "formed," so that, toward the end of the forming process, an oxide layer of approximately 0.2 millimeter thickness is present on the positive plate lugs, and a thin spongey layer of lead is present on the negative plate lugs. After such forming, the positive plates are washed and dried, while the negative plates are also washed and then treated with an anti-oxidant which prevents oxidation of the active material during storage.

Negative formed electrode plates produced in this manner can, without further processing, be united into plate assemblies through welding of the plate lugs. The lugs of the positive formed plates, on the other hand, must be treated further before welding, because the oxide layer which has developed makes it impossible to weld the lugs to the connecting straps.

In producing plate assemblies or so-called elements it is a modern practice in the battery industry to utilize the so-called cast-on-strap process, which is described, for example, in German Pat. No. 1,067,899, corresponding to U.S. Pat. No. 3,072,984. In so doing, the individual plate subassemblies composed of separators and formed or unformed electrode plates stacked upon each other, or else of several plate subassemblies such as those for all the cells of a starter battery, are simultaneously placed into molds filled with liquid lead with their plate lugs pointing downwardly, so that the connecting straps and in some cases also the cell straps are produced. See also German Pat. No. 1,804,800, corresponding to U.S. Pat. No. 3,663,305.

In order to enhance the contact between the molten lead and the plate lugs in this cast-on-strap process, the plate lugs are frequently provided with a flux before casting of the connecting straps or cell connectors. See U.S. Pat. No. 2,980,562.

The above treatment may not be adequate in cases of utilizing formed plates produced in accordance with the process described above, or charged plates capable of being stored dry, because the oxide layer which develops during forming cannot always be completely removed by simply using a flux. Rather, it is both desirable and customary to remove the oxide coating from the plate lugs prior to application of the flux, e.g., by means of rotating brushes. The use of a flux in the cast-on-strap process also does not necessarily permit skipping this preliminary cleaning of the plate lugs of the formed plates. See U.S. Pat. No. 3,461,839. Likewise, it is customary to treat the unformed plate lugs with brushes so as to clean them free of paste which may adhere to them due to the pasting and/or stacking process. In addition, they are sometimes treated with flux in order to achieve defect-free connections between lugs and connector straps.

SUMMARY OF THE INVENTION

Accordingly, it is an object of the invention to treat an unformed electrode plate in such a way that it can be used directly for the assembly into elements without additional cleaning or flux treatment, and so that, during subsequent vat formation process, the plate lug is not also formed and no oxide coating develops on the plate lug.

This and other objects which will appear are achieved, in accordance with the invention, by covering the plate lug of the unformed electrode plate at least partly with a coating of thermoplastic, acid resistant, and adherent material.

BRIEF DESCRIPTION OF DRAWINGS

For further details, reference may be had to the description which follows, in the light of the accompanying drawings, wherein FIG. 1 shows a fragment of an electrode plate embodying the invention; and FIG. 2 shows an enlargement of a section taken along A-B in FIG. 1.

The same reference numerals designate similar elements in the two figures.

DETAILED DESCRIPTION

The material used for coating the plate lug, or at least a portion of the plate lug, as indicated above, should have the following properties:

1. The material should be thermoplastic.
2. Its melting point should be between about 50° and 200°C, being preferably in the range from 120°C to 180°C. This requirement is based on the fact that temperatures of the order of 70°C are reached in the conventional vat-forming of electrode plates. Temperatures of the same order of magnitude are reached when forming is carried out in the actual battery casing (a method which is now being widely used), and the coating material should not melt at that temperature. To provide sufficient margin of safety relative to this forming temperature, the preferred melting point is about 120° to 180°C.
3. The material should be capable of producing a very thin layer.
4. The layer should be free of pores in order to prevent acid from reaching the coated lug during forming.
5. The time required to form the layer should be very short.
6. The layer should be resistant and stable at a temperature of about 70°C in a forming electrolyte of about 1.1 density.

It has been found that these requirements can be met by using polyolefins having a predominantly amorphous structure, such as for example atactic polypropylene or atactic polybutylene. Thermoplastic polyamide can be used, or hot melt glue made from a polyamide base using hydrocarbon wax such as paraffin. Also thermoplastic adhesive mixtures can be used containing copolymers such as those of ethylene and vinylacetate, as well as hydrocarbon wax such as paraffin. These materials have the desired adhesive quality which prevent the coating from being prematurely stripped off during the various processing steps.

Atactic polypropylene has been found suitable for use in vat-forming, as well as in forming within the actual battery casing. Atactic polybutylene, on the other hand has been found particularly suitable for forming within the battery casing, because this takes place after the plates have been welded together.

In order to enhance the fluidity of the thermoplastic material, it may further be desirable to add to it a synthetic or natural resin having a carboxyl function, e.g., rosin or abietic acid, as wetting agent additive. This additive can be present in proportions of between 5 and 20 percent, and preferably 8 to 12 percent by weight. Below these limits, the fluidity of the coating material tends to become inadequate and the quality of the welds deteriorates. Above them, the resistance of the coating to heat and acid declines and so does its effectiveness in preventing oxidation.

Coating of the plate lugs with the oxidation protector may appropriately take place after pasting of the electrode plates. However, if necessary and if the pasting machines permit it, this can also be done before pasting. If coating takes place immediately following the drying step after pasting, then the plate lugs will still be at a temperature of about 60° to 80°C, so that they need to be warmed only briefly in order to reach the preferred coating temperature of about 120° to 150°C.

A wide variety of techniques for coating the electrode plates can be envisioned. For example, the thermoplastic material may be sprayed on the plate lugs, the plate lugs may be dipped into the material, or the coating can be accomplished by means of two counter-rotating, heated rollers which are themselves coated with the hot adhesive by having it drip onto the rollers. It may also be appropriate to place the hot-melt adhesive on the rollers in the form of a stick whereupon the heated rollers cause melting of the appropriate quantity of adhesive from the available solid supply. Finally, it is also possible to apply, to the plate lugs, strands of thermoplastic adhesive of about 2 to 3 millimeters diameter and to roll these flat with a heated roller. In any case, it is necessary to maintain the coating briefly at a temperature of from 120° to 150°C. Cooling can be accomplished by compressed air and the plates can then be stacked without adhering to each other.

Preheating of the plate lugs before application of the thermoplastic adhesive can suitably be done by supplying heat electrically or by applying hot air.

Since the formed plates are stacked before being assembled into elements, it is particularly desirable to make the plate lugs somewhat thinner in those regions in which they are to be provided with a coating in accordance with the invention. This is illustrated in the accompanying figures of drawings, to which reference may now be had. These drawings show in FIG. 1 an electrode plate whose plate lug 2 has a region 3 thinner than the remainder of the lug. This is visible particulary in FIG. 2, which shows an enlarged cross-section taken through a portion of the plate lug of FIG. 1.

As a result, application of the thermoplastic adhesive does not cause local thickening of the electrode plate and unimpeded stacking of the electrode plates remains possible.

Experiments have shown that the plate lugs of electrode plates with such a coating of between 0.1 and 0.5 millimeter thickness in the area of the plate lug do not oxidize during forming, so that essentially trouble-free electrical contact exists between the plate lugs and the connecting straps which are cast later on in the cast-on-strap method. The welds formed in welding plate lugs to previously produced connecting straps were also of defect-free quality. Particularly in the cast-on-strap-process, the costly step of applying a flux and heating before or after such flux application, as well as pre-cleaning of the plate lugs can therefore be omitted.

There remains a residue of the plastic coating in the area on the plate lug below the connecting strap.

This residue and the satisfactory electrical contact are two note worthy features of the battery of the invention.

I claim:

1. Unformed electrode plate for lead storage batteries comprising a plate lug at least partly covered with a coating of material which is thermoplastic, acid resistant and adherent, said coating extending into the area of said lug which will be covered by a connecting strap.

2. Unformed electrode plate according to claim 1, wherein the thermoplastic material has a melting point between 120° and 180°C.

3. Unformed electrode plate according to claim 1, wherein the thermoplastic material is selected from the group of polyamides or polyolefins having a predominantly amorphous structure.

4. Unformed electrode plate according to claim 1, wherein the thermoplastic material is hot-melt adhesive.

5. Unformed electrode plate according to claim 1, wherein the thermoplastic material is selected from the group of atactic polypropylenes or atactic polybutylenes.

6. Unformed electrode plate according to claim 1, wherein the thermoplastic material contains an additive which enhances its wettability, said additive having a carboxyl function of synthetic and/or natural resin.

7. Unformed electrode plate according to claim 6, wherein the additive of carboxyl containing resin is present in the proportions of 5 to 20 percent by weight and preferably 8 to 12 percent by weight.

8. Unformed electrode plate according to claim 1, wherein the plate lug has one portion of thinner cross-section than the remainder of the lug and wherein said thermoplastic coating is present on said portion of thinner cross-section.

9. An assembly of unformed electrode plates for lead storage batteries, said plates comprising plate lugs and each lug being at least partly covered with a coating of material which is thermoplastic, acid resistant and adherent, said coating extending over the area of each lug subsequently covered by a connecting strap.

10. An assembly according to claim 9, positioned within the casing of a lead storage battery.

11. An electrode plate for lead storage batteries, said plate having a plate lug and being produced by a process comprising the steps of coating at least a portion of said lug with a material which is thermoplastic, acid resistant and adherent, and then forming said plate.

12. An electrode plate assembly for lead storage batteries, said assembly comprising a plurality of plates having a plurality of plate lugs, said assembly being produced by a process comprising the steps of coating at least a portion of each said lug with a material which is thermoplastic, acid resistant and adhesive, and then forming said plate.

13. The assembly of claim 12 wherein said process further comprises the step of joining said plates into said assembly before said forming.

14. The assembly of claim 12, wherein said process further comprises the step of joining said plates into said assembly after said forming.

15. A lead storage battery comprising a casing, and an assembly of electrode plates having plate lugs positioned within said casing, said battery being produced by a process which comprises the steps of coating each said lug at least partly with a thermoplastic, acid resistant, adherent material, and then forming said electrode plates.

16. In the method of forming a lead storage battery plate having a plate lug, the step of applying to at least a part of said lug a coating of a thermoplastic, acid resistant, adherent material, said coating extending into the area of said lug which is subsequently covered by a connecting strap.

17. The method of claim 16 wherein said lug has a portion thinner than the rest, and said coating takes place only on said thinner portion.

18. The method of claim 16 wherein said coating takes place prior to forming of said battery plate.

19. The method of claim 16 comprising the further steps of forming said battery plate after said coating has taken place, and attaching a connecting strap to said lug without previously removing said coating.

20. The assembly of claim 9 further comprising connecting straps attached to said lugs, a residue of said coating remaining on said lugs in the areas below the connecting straps.

21. The plate of claim 1 wherein said coating stops short of the plate mass.

* * * * *